United States Patent
Chiang

(10) Patent No.: US 7,981,334 B2
(45) Date of Patent: Jul. 19, 2011

(54) INJECTION MOLDING MACHINE AND METHOD FOR MOLD-ADJUSTING

(75) Inventor: Chenyuen Chiang, Hong Kong (CN)

(73) Assignee: Chen Hsong Asset Management Limited, Hong Kong (CN)

( * ) Notice: Subject to any disclaimer, the term of this patent is extended or adjusted under 35 U.S.C. 154(b) by 0 days.

(21) Appl. No.: 12/665,508

(22) PCT Filed: Jun. 19, 2008

(86) PCT No.: PCT/CN2008/001193
§ 371 (c)(1),
(2), (4) Date: Jan. 15, 2010

(87) PCT Pub. No.: WO2009/000151
PCT Pub. Date: Dec. 31, 2008

(65) Prior Publication Data
US 2010/0155980 A1  Jun. 24, 2010

(30) Foreign Application Priority Data
Jun. 26, 2007  (CN) .......................... 2007 1 0123008

(51) Int. Cl.
*B29C 45/80* (2006.01)
(52) U.S. Cl. ........................ 264/40.5; 425/150; 425/589
(58) Field of Classification Search .................. 264/40.1, 264/40.5, 328.1; 425/150, 589, 595
See application file for complete search history.

(56) References Cited

U.S. PATENT DOCUMENTS

| | | | | |
|---|---|---|---|---|
| 4,304,540 A | * | 12/1981 | Hammon | 425/150 |
| 5,320,517 A | * | 6/1994 | Hirata et al. | 425/589 |
| 5,853,773 A | * | 12/1998 | Choi | 425/136 |
| 6,250,905 B1 | * | 6/2001 | Mailliet et al. | 425/150 |
| 6,468,449 B1 | * | 10/2002 | Fujikawa | 264/40.1 |
| 6,821,104 B2 | * | 11/2004 | Kubota et al. | 425/150 |
| 7,179,409 B2 | * | 2/2007 | Nishino | 264/40.5 |

FOREIGN PATENT DOCUMENTS

| | | |
|---|---|---|
| CN | 2726865 | 9/2005 |
| JP | 2003033954 | 2/2003 |

\* cited by examiner

*Primary Examiner* — Jill L Heitbrink
(74) *Attorney, Agent, or Firm* — Muncy, Geissler, Olds & Lowe, PLLC

(57) ABSTRACT

An injection molding machine and a method for mold-adjusting are provided. The injection molding machine comprises a mold-adjusting mechanism mounted to one side of the fixed platen and being coaxial with the tie bars. Each of the mold-adjusting mechanisms is constructed the same comprising a support frame (11), a motor (12), a mold-adjusting driving wheel (13), a mold-adjusting driven wheel (14), a hydraulic cylinder for positioning (15), a sensor and a control system.

7 Claims, 6 Drawing Sheets

INJECTION MOLDING MACHINE AND METHOD FOR MOLD-ADJUSTING

This application is a national stage of International Application No.: PCT/CN2008/001193, which was filed on Jun. 19, 2008, and which claims priority to Chinese Application No.: 200710123008.7, which was filed in China on Jun. 26, 2007, and which are both herein incorporated by reference.

FIELD OF THE INVENTION

The present invention relates to an injection molding machine, and more particularly to a mold-adjusting mechanism for the injection molding machine and a method for mold-adjusting.

BACKGROUND OF THE INVENTION

The existing injection molding machine mainly comprises a clamping unit, an injection unit, a hydraulic drive mechanism, an electric control mechanism and a machine frame. The mold has to be adjusted to a fixed position and then clamped by powerful clamping force before the injection of the plastic and maintained until the plastic is cooled and cured, then the mold can be opened up and the product is obtained.

Some of the current mold-adjusting mechanisms require simultaneous adjustment to four tie bars, in other words, the four tie bars must be adjusted synchronously. Due to the large size of the injection molding machine, the distances between the four tie bars are long correspondingly, and it is therefore difficult to adjust the tie bars synchronously. Although some of the injection molding machines do not require synchronous adjustment to the tie bars, the mold-adjusting operation still exists in each production cycle, and the production cycle is thus prolonged.

In view of the problems and inconvenience brought by the prior art, there is a demand for improvement.

SUMMARY OF THE INVENTION

The present invention provides an injection molding machine equipped with a mold-adjusting mechanism. The mold-adjusting mechanism can adjust each tie bar separately, and there is no need to adjust the mold in each production cycle.

The present invention also provides a method for mold-adjusting performed on an injection molding machine with a mold-adjusting mechanism.

An injection molding machine composing a fixed platen, a moveable platen located on one side of the fixed platen, a plurality of tie bars provided through the fixed platen and the moveable platen with gear teeth in the middle of the tie bars and the lock nut placed around the tie bars with a shrinking opening engaging the gear teeth, wherein the injection molding machine further comprises a plurality of mold-adjusting mechanisms provided on the opposite side of the fixed platen and be being respectively coaxial with the tie bars, each of the mold-adjusting mechanisms comprises:

a support frame fixed to the opposite side of the fixed platen;

a motor mounted to the support frame;

a mold-adjusting driving wheel with one end mounted to the shaft of the motor and the opposite end mounted to the support frame;

a mold-adjusting driven wheel matching the driving wheel;

a hydraulic cylinder for positioning mounted to the frame and connected with an external hydraulic circuit, wherein the mold-adjusting driven wheel is movably mounted to the piston rod of the hydraulic cylinder;

a first sensor mounted to the lock nut for sensing the engagement between the gear teeth of the tie bars and the shrinking opening of the lock nut; and a control system connected with the motor, the first sensor and the external hydraulic circuit, wherein, when the first sensor senses that the gear teeth of the tie bars fail to engage with the shrinking opening of the lock nut, the motor is controlled by the control system to rotate; once the first sensor senses that the gear teeth of the tie bars engage with the shrinking opening of the lock nut, the injection molding machine is controlled by the control system to operate.

The injection molding machine comprises four tie bars.

The mold-adjusting driven wheel of the injection molding machine further comprises a second sensor and a warning device, wherein the second sensor is a limit switch; and both the second sensor and the warning device are connected with the control system in such a manner that the warning device is controlled by the control system to alert once the driven wheel is beyond the limit switch.

The mold-adjusting driven wheel of the injection molding machine further comprises a third sensor and a warning device, wherein the third sensor is a position sensor; both the third sensor and the warning device are connected with the control system in such a manner that when the control system receives a signal from the first sensor indicating that the gear teeth of the tie bars engage with the shrinking opening of the lock nut, the control system controls the injection molding machine to operate once the position sensor senses that the end surface of the mold-adjusting driven wheel is against the tie bars, otherwise the control system controls the warning device to alert.

The end of the tie bar against the driven wheel is further provided with an extension part fixed to the said end of the tie bars against the end surface of the mold-adjusting driven wheel.

Both the driving wheel and the driven wheel are gears.

A method for mold-adjusting performed on the injection molding machine comprises:

Step 1: the external hydraulic circuit is controlled by the control system to supply oil to the hydraulic cylinder for positioning;

Step 2: the molding-adjusting driven wheel is driven against the tie bars;

Step 3: the first sensor is controlled by the control system to sense the engagement between the gear teeth of the tie bars and the shrinking opening of the lock nut;

Step 4: the signal from the first sensor is determined whether the gear teeth of the tie bars engage with the shrinking opening of the lock nut;

Step 5: If yes, turn to Step 6; otherwise the motor is controlled by the control system to rotate, and then turn to Step 3;

Step 6: the injection molding machine is controlled by the control system to operate and hydraulic circuit to the hydraulic cylinder for positioning is controlled by the control system to unload.

The method further comprises a step followed by Step 6, wherein in the step the control system controls the second sensor to sense whether the end surface of the mold-adjusting driven wheel is against the tie bars; if yes, turn to Step 6, otherwise the control system controls the warning device to alert.

The method further comprises a step following the rotation of the motor controlled by the control system in Step 5 before turning to Step 3, wherein in the step the control system controls the third sensor to sense whether the mold-adjusting driven wheel is beyond the third sensor when the motor drives the mold-adjusting driven wheel; if yes, the control system controls the warning device to alert, otherwise turn to Step 3.

With the above technical solutions, the operation becomes simple in that instead of the mold-adjusting in each processing cycle, only a single mold-adjusting is required when the mold is replaced, besides, simultaneous mold-adjusting is not necessary for the four tie bars.

BRIEF DESCRIPTION OF THE DRAWINGS

The present invention will be further described with reference to the following drawings and embodiments.

Figure 1:
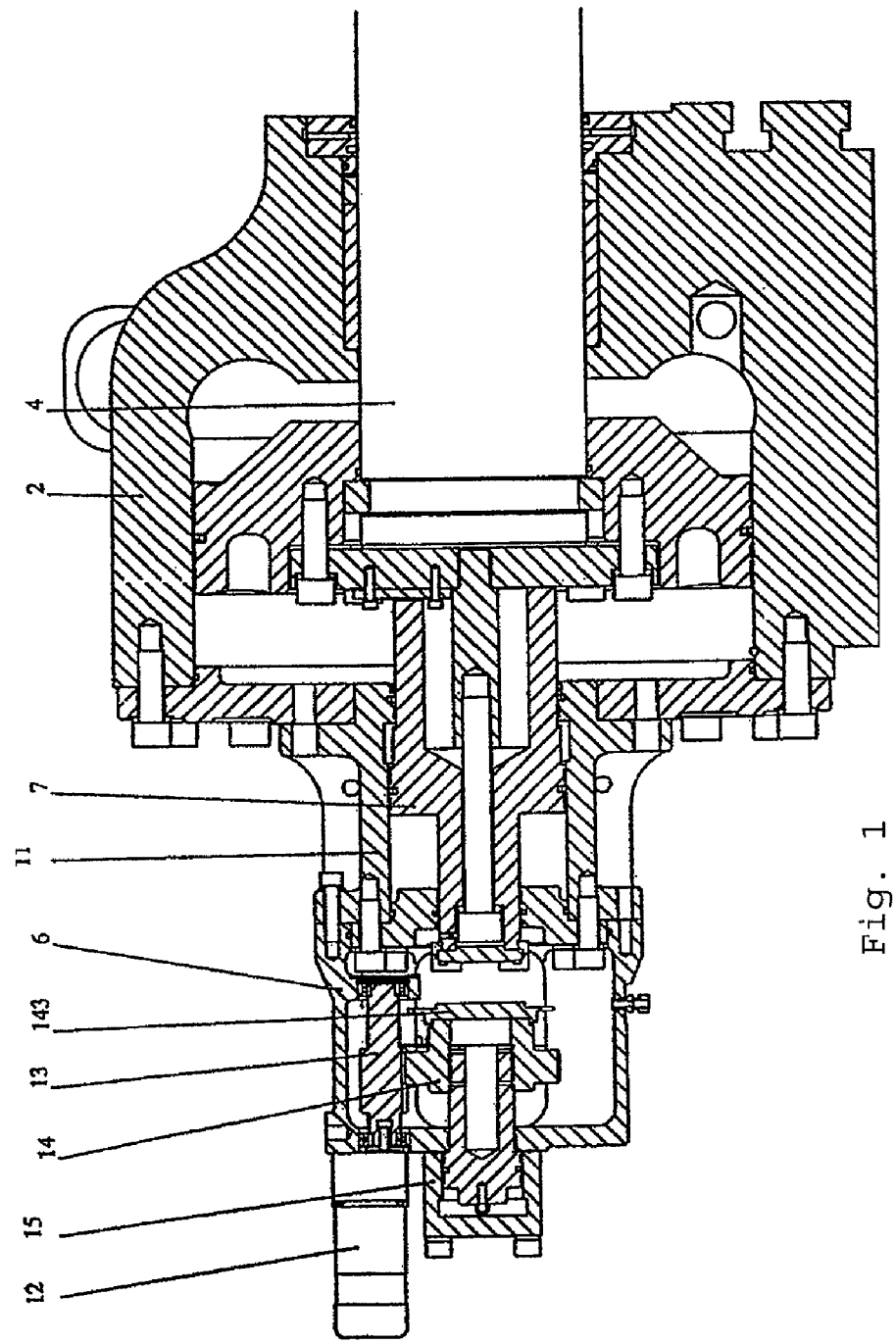
FIG. 1 is a cross sectional view of the mold-adjusting mechanism mounted to the injection molding machine according to the present invention.

Reference numerals in the drawings are described as below.

1 Mold-adjusting mechanism
11 Support frame
12 Motor
13 Mold-adjusting driving wheel
14 Mold-adjusting driven wheel
141 Second sensor
142 Third sensor
143 Cover
15 Hydraulic cylinder for positioning
16 First sensor
2 Fixed platen
3 Moveable platen
4 Tie bar
41 Gear teeth
5 Lock nut
7 Extension part

DETAILED DESCRIPTION OF EMBODIMENTS

As shown in FIGS. 1-7, an injection molding machine with a mold-adjusting mechanism 1 is provided according to the present invention. The mold-adjusting mechanism 1 of the injection molding machine comprises a fixed platen 2, a moveable platen 3 located on one side of the fixed platen 2, four tie bars 4 provided through the fixed platen 2 and the moveable platen 3 with gear teeth 41 in the middle of the tie bars 4, and a lock nut 5 placed around the tie bars 4 (also referred to as tie bar or guide bar) with shrinking opening (not shown in the figures) matching the gear teeth 41. Certainly, the injection molding machine further comprises a machine frame, an injection unit and some other components. As these components are not the features of the invention, and thus omitted in the following description.

The mold-adjusting mechanism 1 is arranged on the opposite side of the fixed platen 2 with its position being level with the tie bars 4, that is to say, there is a mold-adjusting mechanism for each tie bar 4. Hence, there are four tie bars 4 with the same structure for the four mold-adjusting mechanisms 1. Each mold-adjusting mechanism 1 comprises a support frame 11, a motor 12, a mold-adjusting driving wheel 13, a mold-adjusting driven wheel 14, a hydraulic cylinder for positioning 15 and a first sensor 16. Also, the mold-adjusting mechanism 1 further comprises a control system (not shown in the figures).

The support frame 11 is mounted to the said opposite side of the fixed platen 2 as a unit frame, and the components of the mold-adjusting mechanism are fixed to the support frame 11. The support frame 11 may be disassembled into several parts depending on the actual situation.

The motor 12 is mounted to the support frame 11. The motor 12 is a gear motor connected with the control system and controlled by the control system.

One end of the mold-adjusting driving wheel 13 is mounted to the shaft of the motor 12, while the opposite end is mounted to the support frame. The mold-adjusting driving wheel 13 may be a gear with one end mounted to the shaft of the motor and the opposite end pivotably attached to the support frame such that the mold-adjusting driving wheel 13 fixed to the shaft of the motor rotates with the rotation of the motor 12.

The mold-adjusting driven wheel 14 is configured to mate with the driving wheel 13, and may be movably mounted to the piston rod of the hydraulic cylinder for positioning 15. Since the mold-adjusting driving wheel 13 is a gear, the mold-adjusting driven wheel 14 is also a gear engaging with the driving wheel 13. Consequently, when the mold-adjusting driving wheel 13 is driven by the motor 12, the mold-adjusting driven wheel 14 engaging with the driving wheel 13 is also driven. The mold-adjusting driven wheel 14 may further comprise a second sensor 141 and a warning device (not shown in the figures). Both the second sensor 141 and the warning device are connected with the control system. When the mold-adjusting driven wheel 14 is beyond the second sensor 141, the warning device is controlled by the control system to alert. The second sensor 141 is a limit switch. The mold-adjusting driven wheel 14 may further comprise a third sensor 142, and the third sensor 142 is a position sensor. The third sensor 142 is connected with the control system. The injection molding machine is controlled by the control system to operate when the end surface of the mold-adjusting driven wheel 14 is against the tie bars 4. And the warning device is controlled by the control system 14 to alert when the end surface of the mold-adjusting driven wheel 14 is not against the tie bars 4. The tie bars 4 are further provided with an extension part 7 arranged on the end against the driven wheel 14. The extension part 7 is fixed to the tie bars 4 against the end surface of the mold-adjusting driven wheel 14.

A hydraulic cylinder for positioning 15 is mounted to the frame 11 and is connected to an external hydraulic circuit. The control system is connected to the external hydraulic circuit for controlling the external hydraulic circuit to supply oil to the hydraulic cylinder for positioning 15 or for unloading the hydraulic circuit. The mold-adjusting driven wheel 14 is mounted to the piston rod of the hydraulic cylinder 15. The mold-adjusting driven wheel 14 is a gear with interior threads inside the center hole. Peripheral threads are provided on the piston rod to engage with the interior threads, such that the mold-adjusting driven wheel 14 may move along the piston rod. The piston rod is a step-like rod. Namely a boss is provided on the piston rod. The boss is against the support frame in such a manner that the maximum extendable distance of the piston rod is constant.

The first sensor 16 mounted to the lock nut 5 is used for sensing the engagement between the gear teeth of the tie bars 4 and the shrinking opening of the lock nut.

The control system is connected to the motor 12, the first sensor 16 and the external hydraulic circuit. The motor 12 is controlled by the control system to rotate when the first sensor 16 senses that the gear teeth 41 of the tie bars 4 fail to engage with the shrinking opening of the lock nut 5. And once the first sensor 16 senses that the gear teeth 41 of the tie bars 4 engage with the shrinking opening of the lock nut 5, the injection molding machine is controlled by the control system to operate.

Figure 2:
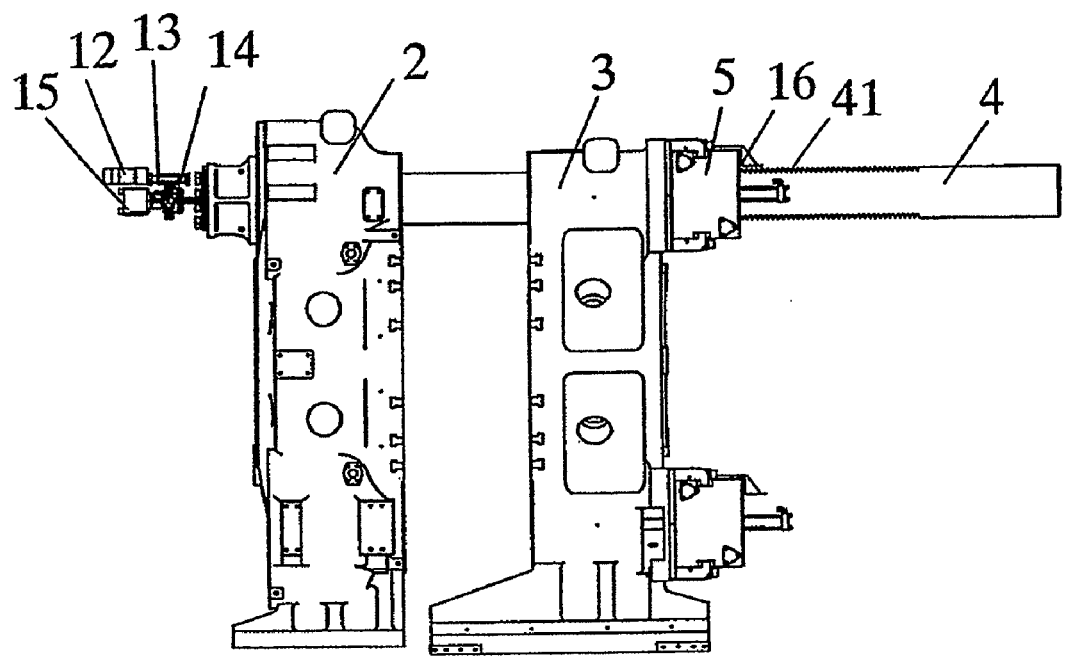
FIG. 2 is a side view of the mold-adjusting mechanism mounted to the injection molding machine according to the present invention, wherein only one tie bar is shown and the cover of the mold-adjusting mechanism is not shown in the figure.
Figure 3:
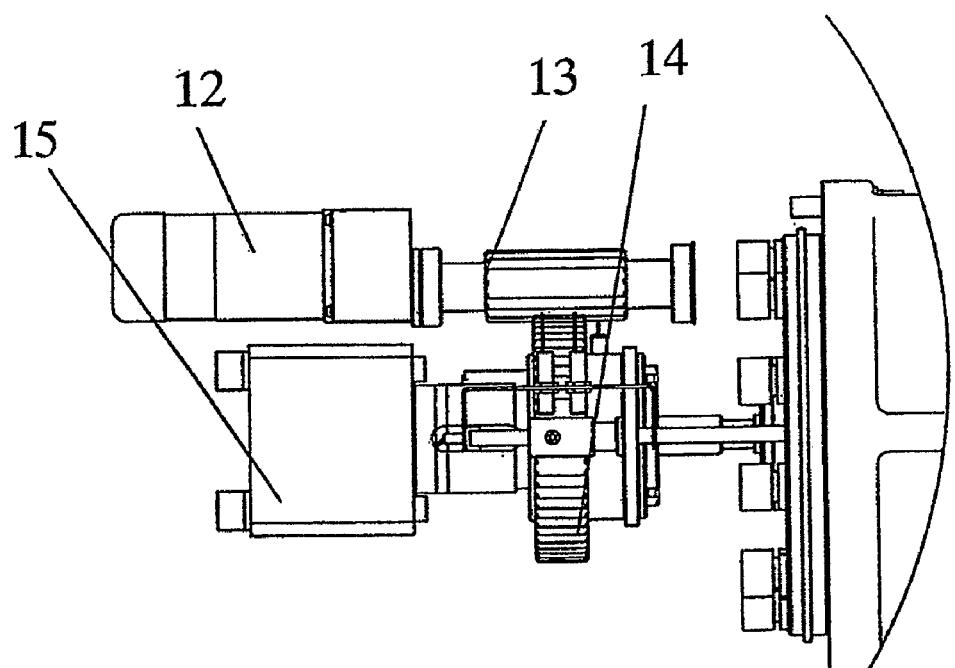
FIG. 3 is an enlarged partial view of the mold-adjusting mechanism of the injection molding machine in FIG. 2.
Figure 4:
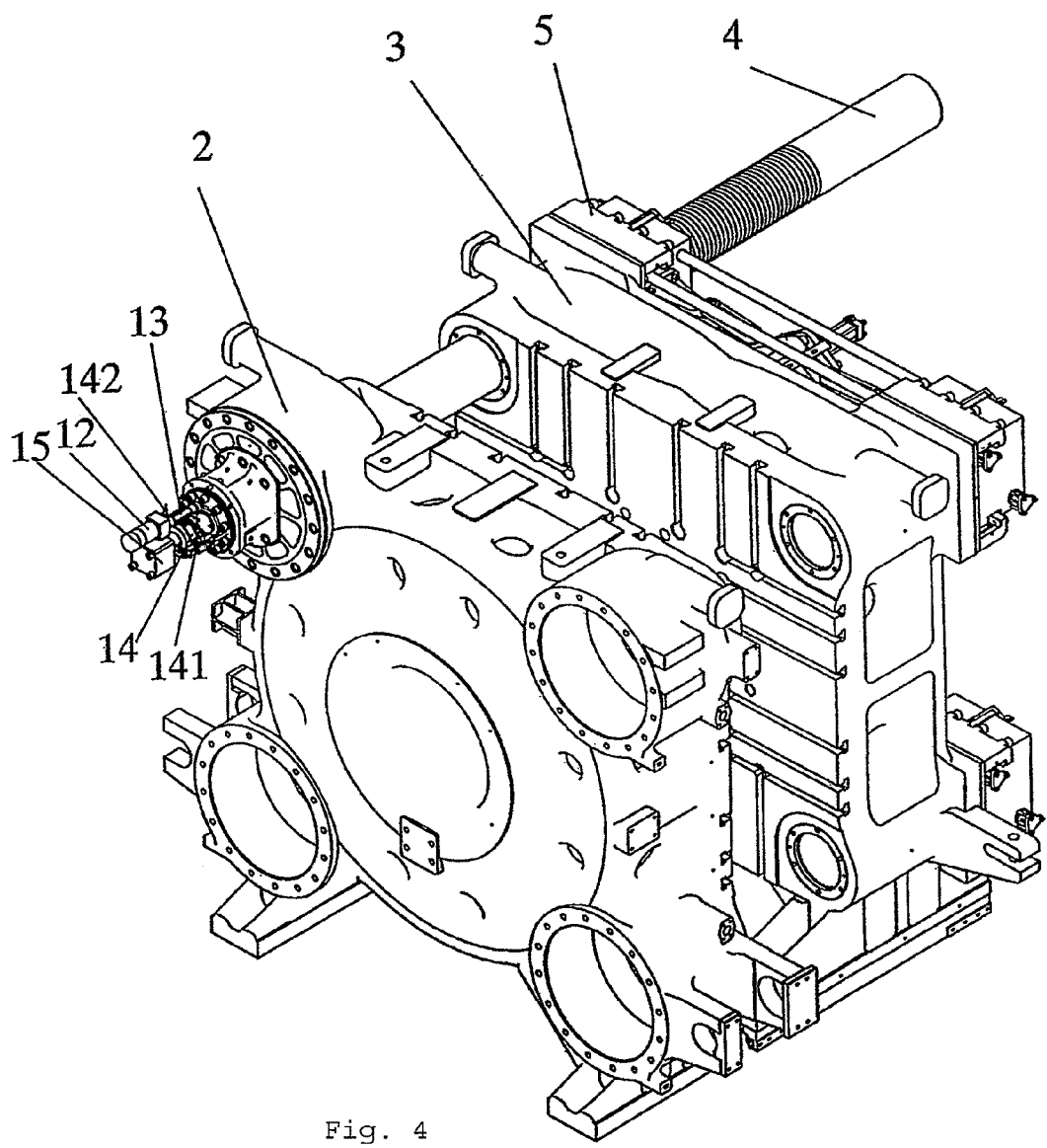
FIG. 4 is a perspective view of the mold-adjusting mechanism mounted to the injection molding machine, wherein only one tie bar is shown and the cover of the mold-adjusting mechanism is not shown in the figure.
Figure 5:
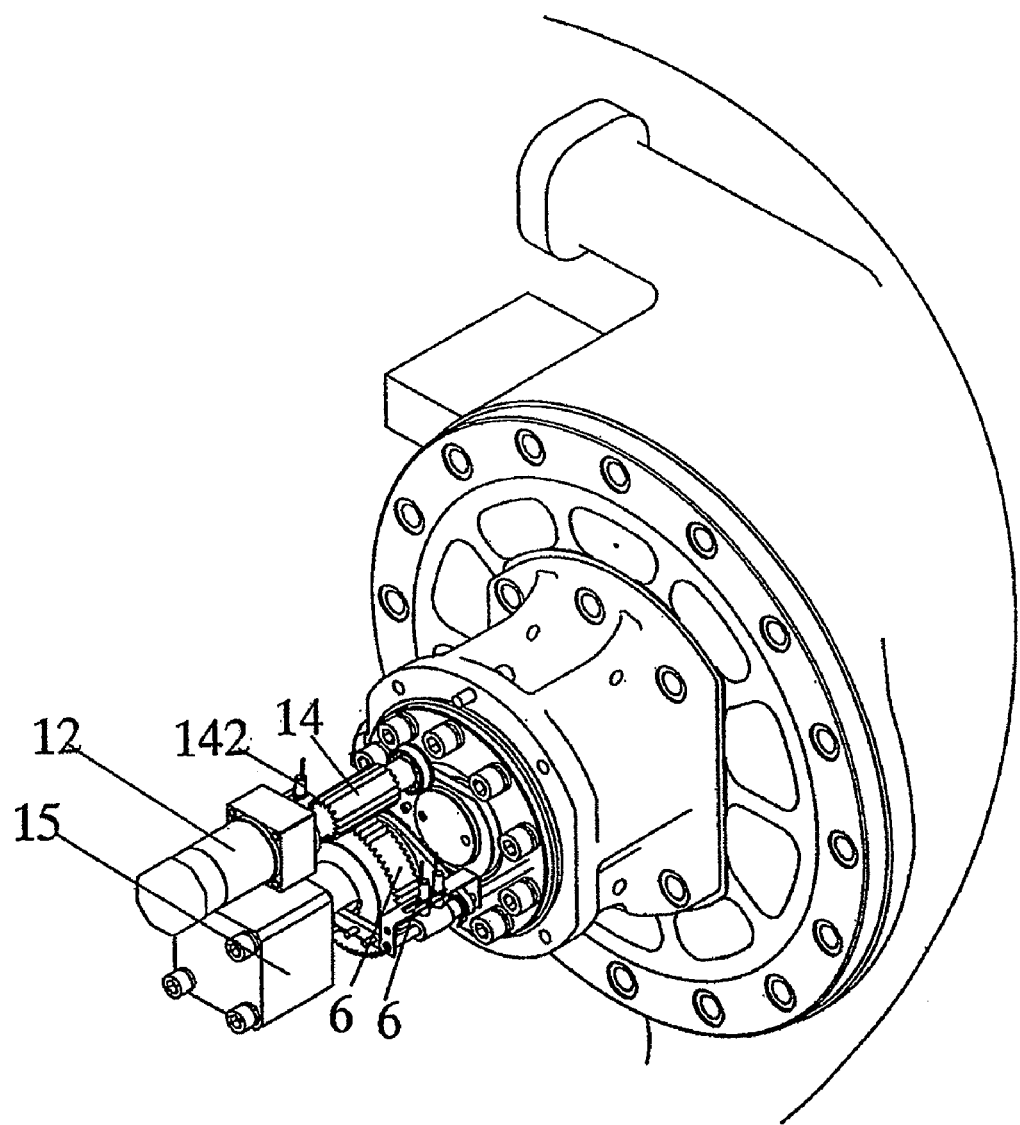
FIG. 5 is an enlarged partial view of the mold-adjusting mechanism of the injection molding machine in FIG. 4.
Figure 6:
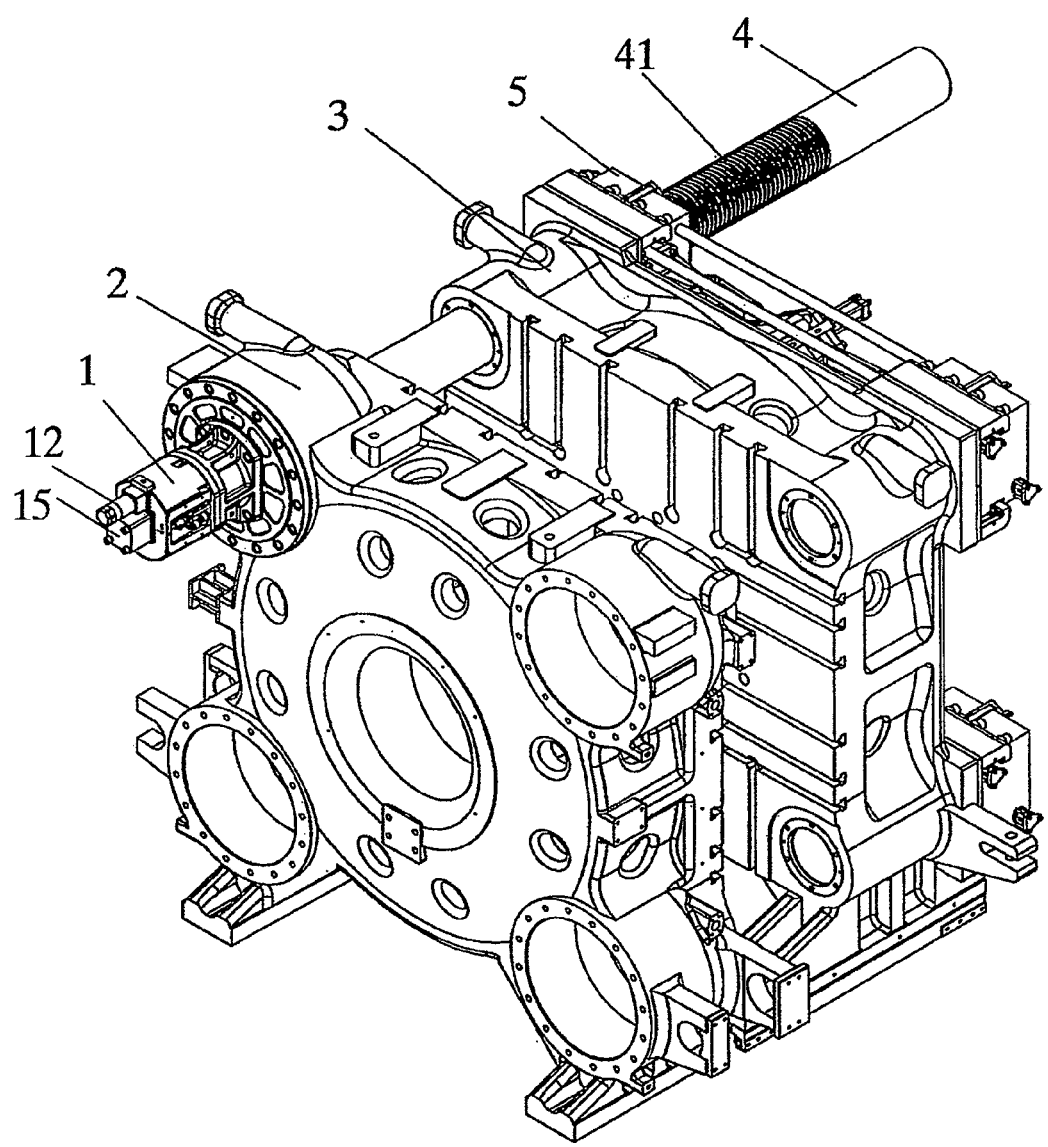
FIG. 6 is a perspective view of the mold-adjusting mechanism mounted to the injection molding machine, wherein only one tie bar is shown and the cover of the mold-adjusting mechanism is present in the figure.
Figure 7:
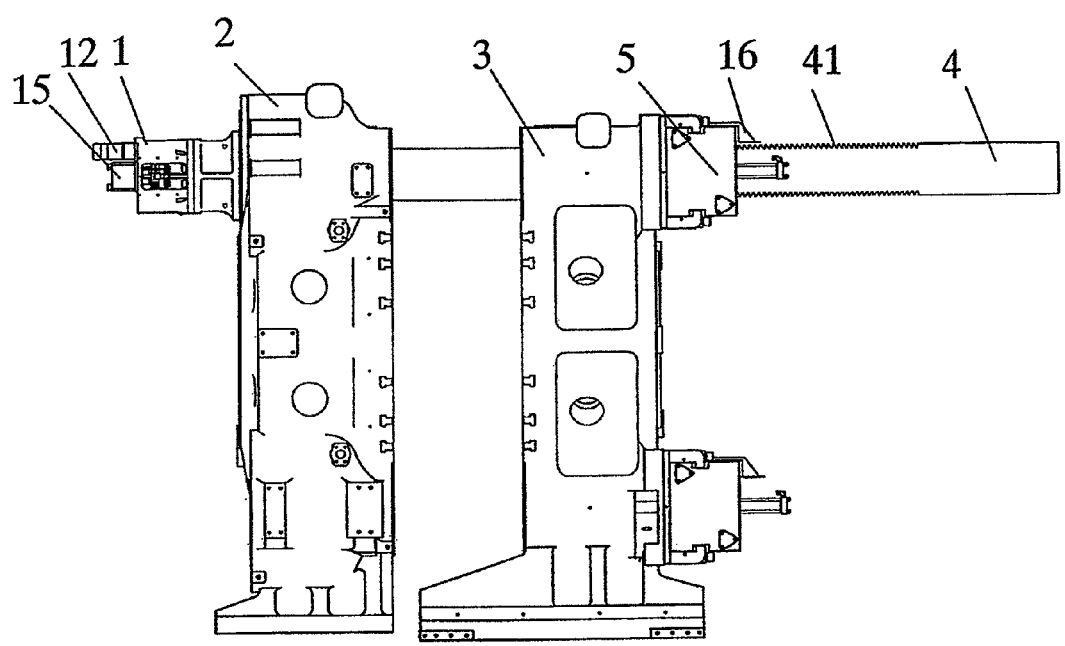
FIG. 7 is a side view of the mold-adjusting mechanism mounted to the injection molding machine according to the present invention, wherein only one tie bar is shown and the cover of the mold-adjusting mechanism is present in the figure.

The mold should be mounted to the injection molding machine in advance of operation. As shown in FIG. 2, the distance between the fixed platen 2 and the movable platen 3 is assumed to be the desired mold height. In other words, the mold is assumed to be ready for operation. As the lock nut 5 follows the movable platen 3 to move along the tie bars 4 in the process of mold-mounting, it cannot ensure that the shrinking opening of the lock nut matches the gear teeth 41 on the tie bars 4. Therefore, it is possible that the gear teeth fail to match correctly, and thus a dislocation occurs. In this case, if the lock nut was fastened, the teeth would collide with each other such that the fastening cannot be assured, and damages may happen to tie bars 4 and the lock nut 5. In view of the above, a method for mold-adjusting is required to adjust the relative position of the lock nut 5 and the tie bars 4.

The method for mold-adjusting performed on the above mentioned mold-adjusting mechanism comprises following steps according to the present invention.

Step 1: The external hydraulic circuit is controlled by the control system to supply oil to the hydraulic cylinder for positioning;

Step 2: The molding-adjusting driven wheel is driven against the tie bars;

Step 3: The first sensor is controlled by the control system to sense the engagement between the gear teeth of the tie bars and the shrinking opening of the lock nut;

Step 4: The signal from the first sensor is determined whether the gear teeth of the tie bars engage with the shrinking opening of the lock nut;

Step 5: If yes, turn to Step 7; otherwise the motor is controlled by the control system to rotate and turn to Step 6;

Step 6: The third sensor is controlled by the control system to sense whether the mold-adjusting driven wheel is beyond the third sensor when the mold-adjusting driven wheel is driven by the motor; if yes, the warning device is controlled by the control system to alert and the machine is shut down, otherwise turn to Step 3.

Step 7: The second sensor is controlled by the control system to sense whether the end surface of the mold-adjusting driven wheel is against the tie bars; if yes, turn to Step 6, otherwise the control system controls the warning device to alert.

Step 8: The injection molding machine is controlled by the control system to operate and the circuit to the positioning cylinder is controlled by the control system to unload.

The molding-adjusting steps will be further described in details.

In step 1, the external hydraulic circuit is controlled by the control system to supply oil to the hydraulic cylinder for positioning 15 in such a manner that the piston rod of the hydraulic cylinder 15 is driven by oil to move. Due to the step-like shape piston rod, the boss of the piston rod may be blocked by the support frame, in other words, the maximum extensible distance of the piston rod is fixed. And the continuous oil pressure keeps the piston rod contacting the frame (or machine frame) as if they were in a fixed connection.

In step 2, the molding-adjusting driven wheel is driven to be against the tie bars. An additional driving device, such as positioning cylinder, is provided on the injection molding machine to drive the tie bars 4 in such a manner that the tie bars 4 is driven to be against the mold-adjusting driven wheel 14. As shown in FIG. 1, the shapes of the tie bars 4 and the mold-adjusting driven wheel 14 are changed accordingly in consideration of integral structure of the injection molding machine. A cover 143 is fixed on the right end of the driven wheel 14. And an extension part 7 is fixed at the left end of the tie bars 4. As shown in FIG. 1, there is a distance between the cover 143 and the extension part 7, that is to say the cover has not been against the extension part 7. When the extension part 7 is pushed by the external force to be against the cover 143, the cover 143 is connected to the driven wheel 14 fixedly in that the extension part 7 is fixedly connected to the tie bars 4. In other words, it is equivalent to that the tie bars 4 are against the driven wheel 14. The driven wheel 14 is engaged with the piston rod by threads in such a manner that the driven wheel 14 can only rotate around the piston rod instead of moving. Therefore the tie bars are against the driven wheel 14 without a capability of moving the driven wheel 14.

In Steps 3-5, the first sensor 16 is controlled by the control system to sense the engagement between the gear teeth 41 of the tie bars 4 and the shrinking opening of the lock nut 5. And the first sensor 16 is also controlled by the control system to sense whether the gear teeth 41 of the tie bars 4 match the shrinking opening of the lock nut 5. If the first sensor 16 senses that the gear teeth 41 of the tie bars 4 fail to match the shrinking opening of the lock nut 5, the motor 12 is controlled by the control system to rotate. Then the mold-adjusting driving wheel 13 is driven by the motor 12, and the mold-adjusting driven wheel 14 is driven by the mold-adjusting driving wheel 13. Because the cover 143 is against the tie bars 4, the driven wheel 14 pushes the tie bars 4 to the right once the first sensor 16 senses that the gear teeth 41 of the tie bars 4 engage the shrinking opening of the lock nut 5. Here, the control system locks the motor 12, and the driving wheel 13 and the driven wheel 14 can neither move to the left nor to the right. At this moment, the motor 12, the driving wheel 13, the driven wheel 14 and the positioning cylinder 15 are all fixed to ensure the cover 143 to stay at a fixed position. Thus, once the extension part 7 is against the cover 143, the lock nut 5 is ensured to match the tie bars 6 without mold-adjusting each time.

If the gear teeth 41 of the tie bars 4 fail to match the shrinking opening of the lock nut 5, a distance of one tooth is dislocated at the maximum. The second sensor 141 on the driven wheel 14, such as a limit switch, limits the distance to the width of at least one gear tooth. When the tie bars 4 are adjusted by the driven wheel 14, the warning device is controlled by the control system to alert once the driven wheel 14 is beyond the distance limited by the second sensor 141. And if yes, within the distance limited by the limit switch, return to Step 3, i.e. the control system turns to control the first sensor 16 to sense the engagement between the gear teeth 41 of the tie bars 4 and the shrinking opening of the lock nut 5. This makes sure that the driven wheel 14 won't spin out of the piston rod.

Following the above steps, the control system returns to Step 3. Due to the above adjustment, the first sensor 16 senses that the gear teeth 41 of the tie bars 4 have engaged with the shrinking opening of the lock nut 5. The control system then locks the motor 12 and controls the third sensor 142 to sense whether the tie bars 4 are against the driven wheel 14. If the tie bars 4 are not against the driven wheel 14, the control system controls to shut down the machine and controls the warning device to alert. As in the case above, although one end of the tie bars 4 has been fastened by the lock nut 5, the opposite end is suspended such that the tie bars 4 are not ensured to bear the pressure brought by the operation of the injection molding machine.

If the tie bars 4 are against the driven wheel 14, the control system unloads the hydraulic circuit to the positioning cylinder 15, and the control system then controls the lock nut 5 to clamp the tie bars 4 and controls the operation of the injection molding machine. As the injection molding machine operates, the tie bars 4 transform under force and usually they extend. Unloading the hydraulic cylinder provides a long distance for the tie bars 4 to move in such a manner that the service life of the tie bars extends.

During the operation of the machine, the impact force inside the injection molding machine may be so strong that it may make the driven wheel 14 be no longer against the tie bars 4 or the gear teeth 41 of the tie bars 4 fail to match the shrinking opening of the lock nut 5. Thus some of the above steps will be performed by the control system for detecting purpose in each cycle. The following steps may comprise some of the above steps, but they are not the same. And they have no association with the above steps when performing.

Step A: The external hydraulic circuit is controlled by the control system to supply oil to the hydraulic cylinder for positioning;

Step B: The first sensor is controlled by the control system to sense the engagement between the gear teeth of the tie bars and the shrinking opening of the lock nut;

Step C: The signal from the first sensor is determined whether the gear teeth of the tie bars engage with the shrinking opening of the lock nut;

Step D: If yes, turn to Step E; otherwise the warning device is controlled by the control system to alert;

Step E: The second sensor is controlled by the control system to sense whether the end face of the mold-adjusting driven wheel is against the tie bars; if yes, turn to Step F, otherwise the control system controls the warning device to alert and shuts down the machine.

Step F: The injection molding machine is controlled by the control system to operate and the hydraulic circuit to the positioning cylinder is controlled by the control system to unload.

In other words, during each injection process the control system will sense whether the driven wheel is against the tie bars and whether the gear teeth of the tie bars match the shrinking opening of the lock nut. If any abnormal scenario occurs, the control system controls to alert. If no abnormal scenario occurs, the control system controls the injection molding machine to operate. Therefore, the mold-adjusting operation is not required for each production cycle and the security of the injection machine is guaranteed.

The foregoing description of the invention has been presented for purposes of illustration and description. It is not intended to be exhaustive or to limit the invention to the precise form disclosed, and modifications and variations would become clear to those skilled in the art after perusal of this application. The modifications and variations should also fall within the scope of the present invention.

What is claimed is:

1. An injection molding machine composing a fixed platen, a moveable platen located on one side of the fixed platen, a plurality of tie bars provided through the fixed platen and the moveable platen with gear teeth in the middle of the tie bars and a lock nut placed around the tie bars with a shrinking opening engaging the gear teeth, wherein the injection molding machine further comprises a plurality of mold-adjusting mechanisms provided on the opposite side of the fixed platen and being respectively coaxial with the tie bars, each of the mold-adjusting mechanisms comprises:

a support frame fixed to the opposite side of the fixed platen;

a motor mounted to the support frame;

a mold-adjusting driving wheel with one end mounted to the shaft of the motor and the opposite end mounted to the support frame;

a mold-adjusting driven wheel matching the driving wheel;

a positioning cylinder mounted to the frame and connected to an external hydraulic circuit, wherein the mold-adjusting driven wheel is movably mounted to a piston rod of a hydraulic cylinder;

a first sensor mounted to the lock nut for sensing the engagement between the gear teeth of the tie bars and the shrinking opening of the lock nut; and a control system connected to the motor, the first sensor and the external hydraulic circuit, wherein, when the first sensor senses that the gear teeth of the tie bars fail to engage with the shrinking opening of the lock nut, the control system controls the motor to rotate; once the first sensor senses that the gear teeth of the tie bars engage with the shrinking opening of the lock nut, the control system controls the injection molding machine to operate wherein a second sensor and a warning device are provided on the driven wheel, wherein the second sensor is a limit switch, and wherein both the second sensor and the warning device are connected to the control system in such a manner that the control system controls the warning device is controlled by the control system to alert once the driven wheel is beyond the limit switch.

2. The injection molding machine according to claim 1, wherein the machine comprises four tie bars.

3. The injection molding machine according to claim 1, wherein a third sensor and a warning device are provided on the driven wheel;

the third sensor is a position sensor;

both the third sensor and the warning device are connected to the control system in such a manner that when the control system receives a signal from the first sensor indicating that the gear teeth of the tie bars engage with the shrinking opening of the lock nut, the control system controls the injection molding machine to operate once the position sensor senses that the end surface of the mold-adjusting driven wheel is against the tie bars, otherwise the control system controls the warning device to alert.

4. The injection molding machine according to claim 3, wherein the end of the tie bar against the driven wheel is further provided with an extension part fixed to the said end of the tie bars against the end surface of the mold-adjusting driven wheel.

5. The injection molding machine according to claim 1, wherein both the driving wheel and the driven wheel are gears.

6. A method for mold-adjusting performed on an injection molding machine, wherein the method comprises:
   Step 1: an external hydraulic circuit is controlled by a control system to supply oil to a hydraulic cylinder for positioning;
   Step 2: a molding-adjusting driven wheel is driven against tie bars;
   Step 3: the first sensor is controlled by the control system to sense the engagement between gear teeth of the tie bars and a shrinking opening of a lock nut;
   Step 4: a first sensor is controlled by the control system to sense an engagement between the gear teeth of the tie bars and the shrinking opening of the lock nut;
   Step 5: If yes, turn to Step 6; otherwise the motor is controlled by the control system to rotate, and then turn to Step 3; and
   Step 6: the injection molding machine is controlled by the control system to operate and the hydraulic circuit to the hydraulic cylinder for positioning is controlled by the control system to unload the hydraulic circuit,
   wherein the method further comprises a step following the step of controlling the rotation of the motor with the control system in Step 5 before turning to Step 3, wherein, in the step, the control system controls the third sensor to sense whether the mold-adjusting driven wheel is beyond the third sensor when the motor drives the mold-adjusting driven wheel, if yes, the control system controls the warning device to alert, otherwise turn to Step 3.

7. The mold-adjusting method according to claim 6 further comprises a step followed by Step 6, wherein
   in the step the control system controls the second sensor to sense whether the end surface of the mold-adjusting driven wheel is against the tie bars; if yes, turn to Step 6, otherwise the warning device is controlled by the control system to alert.

* * * * *